United States Patent [19]

Baumann

[11] Patent Number: 4,955,582

[45] Date of Patent: Sep. 11, 1990

[54] WEIRLESS DIAPHRAGM VALVE

[76] Inventor: Hans D. Baumann, 32 Pine St., Rye, N.H. 03870

[21] Appl. No.: 393,393

[22] Filed: Aug. 14, 1989

[51] Int. Cl.⁵ .............................................. F16K 7/17
[52] U.S. Cl. .................................... 251/58; 251/63.4; 251/331
[58] Field of Search .................. 251/58, 62, 63.4, 331

[56] References Cited

U.S. PATENT DOCUMENTS

| | | | |
|---|---|---|---|
| 2,348,083 | 5/1944 | McCabe | 251/331 |
| 3,412,974 | 11/1968 | Harris | 251/331 |
| 3,451,423 | 6/1969 | Priese | 251/331 X |
| 3,666,230 | 5/1972 | Pauliukonis | 251/331 X |
| 4,609,178 | 9/1986 | Baumann | 251/331 X |
| 4,819,691 | 4/1989 | Lofgren | 251/331 X |

FOREIGN PATENT DOCUMENTS

| | | | |
|---|---|---|---|
| 842019 | 7/1960 | United Kingdom | 251/331 |
| 853357 | 11/1960 | United Kingdom | 251/331 |
| 1512088 | 5/1978 | United Kingdom | 251/331 |

Primary Examiner—Robert G. Nilson

[57] ABSTRACT

A valve used for controlling the flow of fluid consisting of a housing with coaxial inlet and outlet ports on the opposite side of a conical chamber having an upper terminating flanged surface capable of retaining a flat, elastomeric diaphragm. A conical element having a profile complimentary to that of the conical chamber which, together with a suitable actuator mechanism, is capable of stretching said diaphragm to form a sealing interface between said conical piston and said cavity, thereby, blocking fluid flow between the two ports.

3 Claims, 1 Drawing Sheet

WEIRLESS DIAPHRAGM VALVE

BACKGROUND OF THE INVENTION

This invention relates to a valve for controlling or blocking the flow of fluid between two ports using a stretchable diaphragm and employing an actuating device that is capable of amplifying external forces to aid in the stretching of said diaphragm and to overcome internal fluid pressures.

Valves of this type are used for corrosive, erosive, and also sanitary applications where there must be no hidden cavity that may harbor bacteria or other impurities. Furthermore, valve parts wetted by such critical fluids must be made from highly polished metal requiring easy accessability of such metal parts. A prior art valve used for such service is U.S. Pat. No. 4,813,648 in which an elastomeric seal is placed around the circumference of a movable metallic plug or piston in order to block fluid flow between two coaxial ports. However, such a design is not permissible for certain biotechnical applications since it offers narrow cavities between the sliding interfaces of the piston and valve housing. Such narrow cavities are very difficult to sterilize and would require the frequent disassembly of such a valve for cleaning purposes. My invention overcomes these difficulties by placing the moveable piston behind a stretchable diaphragm, thereby, providing absolutely no cavities within the wetted valve portion.

Other prior art valves of this type offer valve cavities that are nearly identical in cross-sectional shape to my invention, however, their diaphragm design is molded to roll into the receptive, sealing body cavity (See FIG. 4 of my application). Such rolling diaphragms require precision tooling for molding purposes, which would also be expensive if one considers the number of different types of elastomers that might have to be made depending on the type of service application. Finally, any convoluted portion protruding out of the original body cavity might hinder the drainage and enhance the entrapment of impurities of the valve. In my invention, the diaphragm can be cut from any available sheet stock. Furthermore, by stretching the diaphragm, there will be no slackened portion forming undesirable cavities when the valve is open in contrast to said prior convoluted art diaphragms.

Lastly, the diaphragm in my invention has a built in retention force which enables it to assume its original shape, thereby, overcoming the suction effects if the valve is handling a fluid in the state of vacuum. No mechanical attachment of my diaphragm is therefore required in contrast to prior molded art diaphragms which do require a mechanical coupling for their respective pistons or stems (See FIG. 4).

The degree of tension within the diaphragm is, besides the mechanical stress limitation of the selected elastomer, a function of the cone angle. If the cone angle (included angle of chamber 6) is very large, than there is little stretching (strain) of the elastomer, i.e. very little tension in the material that would tend to restore the elastomer to its original flat shape. If the angle is too small, then the internal stress resulting from the stretching will exceed the yield point, and the elastomer will remain permanently deformed. I have found that a cone angle of between 70 and 100 degrees gives the best results in staying within the elastic limits of most elastomers while providing enough "restoration" stress to resist a full vacuum pressure differential to separate the diaphragm from the outer surface of conical element 12.

For sterilization purposes, it is desirable that the housing and mechanism be of low mass and have no air pockets, which is again very easily achieved in my invention. Another requirement is that these valves should be able to be actuated by air yet be very compact. I offer for this reason an amplifying mechanism that is capable of multiplying the forces of a relatively small air cylinder which will thus be able to overcome not only the stretching resistance of the sealing diaphragm, but also the opposing hydrostatic fluid forces. A further improvement of my invention is in the retention of the diaphragm, which not only concentrates the clamping forces against the housing at the point of the most likely entrance of contaminants, but also allows an escape area for that portion of the clamped diaphragm which sees swelling due to the heating action of sterilizing steam.

These and other objectives of my invention will be more easily understood from the following descriptions and annexed drawings:

DETAILED DESCRIPTION

Figures 1, 2:
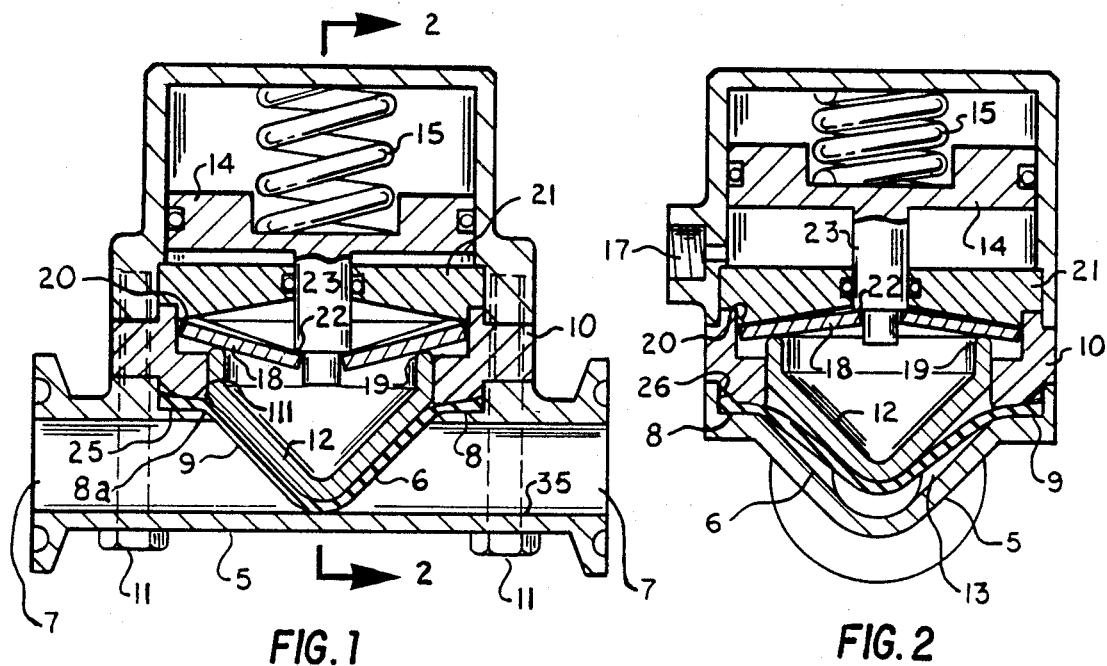
FIG. 1 is a vertical, cross-sectional view of a preferred embodiment of my invention shown in conjunction with a pneumatic cylinder actuator and mechanical amplifying linkages.
FIG. 2 is a cross-section of the valve of FIG. 1 taken along the line 2—2 and shown in the open position.

Referring to FIG. 1, a preferred embodiment of my invention comprises a housing 5 having a central, conical chamber 6, and two coaxial fluid access ports 7 shown here with sanitary style end fittings such as may be found for food applications. Conical chamber 6 terminates at an upper, flattened flange surface 8 which retains an elastomeric diaphragm 9 whose outer rim is clamped in between flange surface 8 and a spacer 10 by suitable bolting means 11. Spacer 10 has a central circular opening 111 slidingly engaging a hollow, conical element 12 whose outer conical surface is complimentary to the conical surface 6 of housing 5 and capable, when forced into a lower position, to stretch diaphragm 9 in order to serve as the sealing interface (as shown in FIG. 1) between said two conical surfaces, thereby preventing fluid from passing between the two coaxial ports 7.

Figure 3:
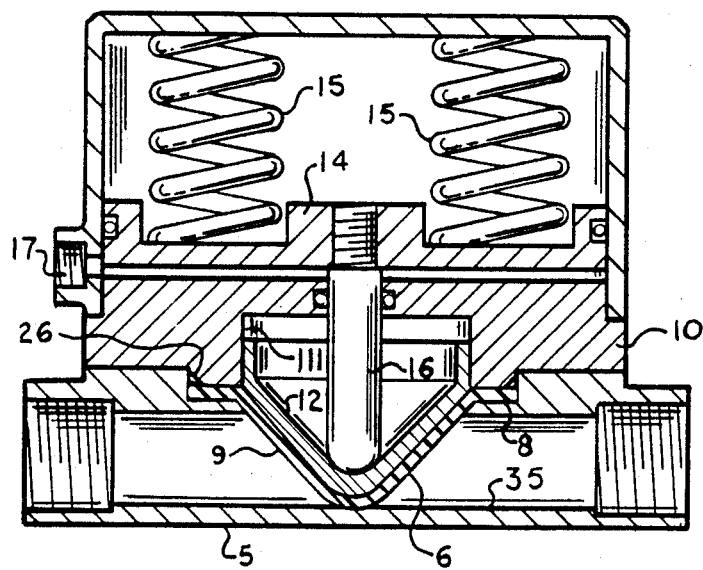
FIG. 3 is a central, cross-sectional view of a weirless diaphragm valve in conjunction with a spring opposed piston actuator, without mechanical amplifying means.

In FIG. 2, conical element 12 is shown withdrawn, thereby allowing diaphragm 9 to partially resume its originally flattened shape thus providing a V-shaped flow area 13 between its exterior, lower surface and the wall of the conical chamber 6 thus providing fluid access between ports 7. In FIG. 3, downward compression, whereby closure of the valve is provided by a piston 14 is motivated by the compressive forces of springs 15. This downward force is further communicated via a stem 16 to the inside center of conical element 12. To open the valve, a suitable air signal is communicated to port 17 thereby forcing piston 14 and stem 16 upwards, and allowing the retained tension (due to stretching from its originally flattened shape) of the diaphragm 9, together with existing fluid forces in chamber 6, to push both diaphragm 9 and conical element 12 up and to allow fluid flow through the valve.

For reasons of economy and space, it is very desirable for pneumatic valve actuators to be as compact as possible. To achieve such objectives, the preferred embodiment of my invention, shown in FIG. 1, utilizes a mechanical amplifying device to multiply the cylinder and/or spring force, thereby greatly reducing the size of the required pneumatic actuating device. This is accomplished by placing a suitable number (preferably 4) of metal bars 18 over the terminating, upper bearing surface 19 of conical element 12. The outer terminating portion of bars 18 contact pivot point 20 at the lower rim surface of a lower cylinder closure 21 while the inner terminating edge is in contact with a lower stepped shoulder 22 of piston stem 23. Upon down movement of piston stem 23, shoulder 22 will force bars 18 to deflect downward via pivot point 20, thereby exerting a downward force on conical element 12. The motion of conical element 12 is reduced from the motion of piston stem 23 by a ratio given by (distance 20–22)/(distance 20–19). A typical amplifying ratio is 2.5. Since the travel is reduced by this ratio, it also means that the force exerted by piston stem 23 is amplifying by a like ratio. Therefore, one is able to reduce the cylinder diameter substantially without sacrificing the shut-off capabilities of my valve.

For sanitary applications, it is desirable to have no valve crevices that could harbor bacteria or other impurities. For example, in the conventional valve shown in FIG. 4, diaphragm compression is between two flat surfaces 24 which could lead to the penetration of bacteria along these interfaces. In my invention, this problem is solved by configuring the lower surface of spacer 10, that is in contact with the diaphragm in a slight taper, thereby concentrating the maximum diaphragm compression along the rim 8a of conical chamber 6 where bacterial penetration would most likely occur. Another problem encountered is the absorption of volumetric changes of sealing diaphragm 9 when sterilizing heat (usually from saturated steam) is employed. My invention provides for a conical chamfer 26 which provides an open void to that part of the clamped diaphragm that undergoes swelling due to thermal expansion. Finally, drainage, even in the horizontal position, is provided by having the bottom of chamber 6 be in line with port bore 35.

Even though my invention is illustrated by preferred embodiments, numerous changes in the design, such as replacing the shown pneumatic cylinder with a manual or electric actuator, or placing a wave spring to aid in the uplift of conical element 12, to have threaded or flanged access ports, or to partially or fully mold diaphragm 9 into other than a flat shape, shall distract from the scope of my claims.

Figure 4:
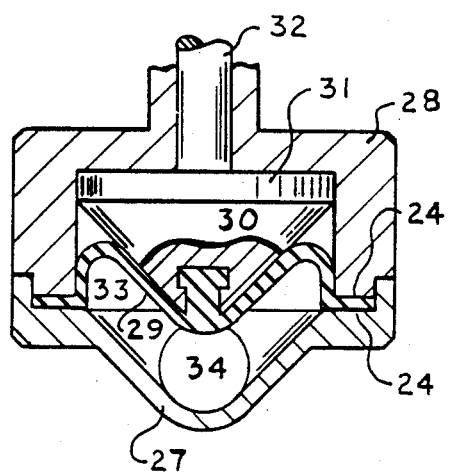
FIG. 4 is a central, cross-sectional view perpendicular to the axis of fluid flow of a conventional, state-of-the-art diaphragm valve.

To demonstrate prior art, I have shown a conventional diaphragm valve in FIG. 4 comprising a housing 27, a bonnet 28, and a pre-molded, convoluted diaphragm 29, having a central, T-shaped coupling portion 30, which engages a similarly shaped recess in a piston 31 motivated by a stem 32. Coupling 30 is necessary to open the conventional diaphragm valve, specifically under vacuum service (not required in my invention due to the stored strain forces in my originally flat diaphragm). When placed in a vertical, fluid axis position, the cavity formed by convolution 33 will prevent fluid from fully draining through access port 34. A convoluted diaphragm, particularly with the coupling portion added, requires very expensive tooling, and multiple production runs with those toolings required for furnishing diverse materials to suit different applications adds more expense. No such cost limitations are found with my flat diaphragm, which simply can be cut from any existing sheet stock.

Finally, a convoluted diaphragm, shown in FIG. 4, when subjected to high fluid pressure, will more likely fail than the diaphragm in my invention which will have substantially more support against pressure even in the open position as shown in FIG. 2.

Having thus shown and explained my invention, I claim the following:

1. Diaphragm valve comprised of a housing having inlet and outlet ports and a conical chamber having a cone angle of less than 120 degrees straddling said ports and terminating in an upper flanged surface, spacer means suitably attached to the upper portion of said housing and having a lower flanged surface cooperating with and retraining and compressing between said upper flanged surface of the housing the outer rim of a non-convoluted elastomeric diaphragm capable of stretching and assuming the shape of said conical chamber during valve closure, and wherein said diaphragm in its undeformed stage is essentially flat in shape, said spacer means having a central opening slidingly engaging a conical element capable of moving said diaphragm towards engagement with the walls of said conical chamber thereby blocking fluid flow between said ports, and wherein said conical element is motivated by a suitable actuating device having a stem.

2. The valve of claim 1, wherein the lower flanged surface of said spacer means has a chamfered portion at its exterior pheriphery providing, in conjunction with the upper flanged surface of said housing, space to allow for volumetric displacement of the outer rim of said diaphragm caused by thermal expansion, and wherein at least one of said flanged surfaces is tapered to provide added compression of said outer rim of the diaphragm near said opening in the spacer means.

3. The valve of claim 1, wherein said actuating device has a lower closure plate having a rim portion whose diameter exceeds that of the central opening in said spacer means, and wherein said conical element is hollow and has an upper, cylindrical wall portion to serve as a bearing surface, and wherein said actuator stem has a stepped shoulder at its lower terminating tip, a number of metal bars evenly spaced around with one flat surface on one end touching the rim portion of said closure plate while their other end is in contact with the stepped shoulder of said stem and wherein all bars are so disposed as to exert a displacement force with their near central portions on their other opposite flat surface onto the bearing surface of the conical element causing the latter into an axial displacement parallel to, but at a much lower rate than, the displacement of the actuator stem.

* * * * *